United States Patent [19]
Williams

[11] Patent Number: 5,309,965
[45] Date of Patent: May 10, 1994

[54] MULTIPLE PITCH SEQUENCE OPTIMIZATION

[75] Inventor: Thomas A. Williams, North Canton, Ohio

[73] Assignee: General Tire, Inc., Akron, Ohio

[21] Appl. No.: 747,693

[22] Filed: Aug. 20, 1991

[51] Int. Cl.⁵ .............................................. B60C 11/11
[52] U.S. Cl. .................................................. 152/209 R
[58] Field of Search ................................... 152/209 R

[56] References Cited

U.S. PATENT DOCUMENTS

| | | | |
|---|---|---|---|
| 2,124,821 | 7/1938 | Hubach | 152/209 R |
| 2,255,994 | 9/1941 | Bush | 152/209 R |
| 2,878,852 | 3/1959 | Lippman et al. | 152/209 |
| 3,926,238 | 12/1975 | Vorih | 152/209 |
| 4,598,748 | 7/1986 | Campos et al. | 152/209 |
| 4,721,141 | 1/1988 | Collette et al. | 152/209 R |
| 4,936,364 | 6/1990 | Kajiwara et al. | 152/209 |

FOREIGN PATENT DOCUMENTS

| | | | |
|---|---|---|---|
| 0246996 | 11/1987 | European Pat. Off. | 152/209 R |
| 0114594 | 4/1989 | European Pat. Off. | 152/209 R |

Primary Examiner—Michael W. Ball
Assistant Examiner—Nancy T. Krawczyk
Attorney, Agent, or Firm—Calfee, Halter & Griswold

[57] ABSTRACT

A tire tread has a plurality of base pitches arranged in at least two circumferential sections around the tire. The base pitches have at least two different pitch lengths and include a plurality of load-supporting tread blocks. The different pitch lengths of the base pitches form a pitch sequence in each circumferential section of the tire. The pitch sequences in the sections are arranged such that the noise produced by the base pitches in the tire tread is a low level, distributed noise to reduce the noise produced by the tire when the tire is in use.

15 Claims, 3 Drawing Sheets

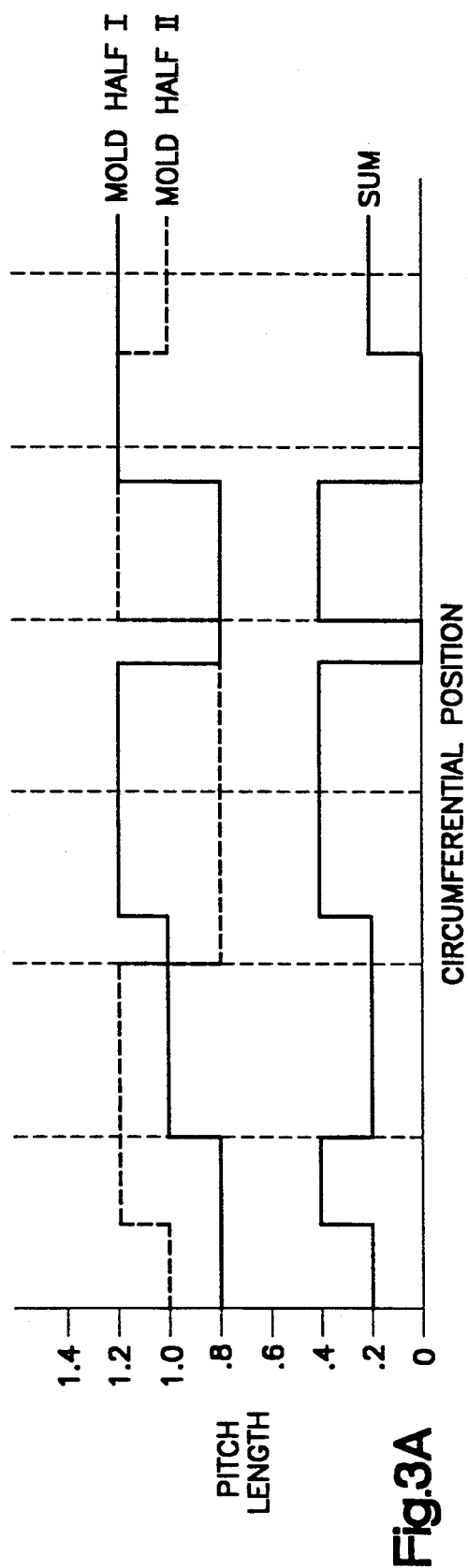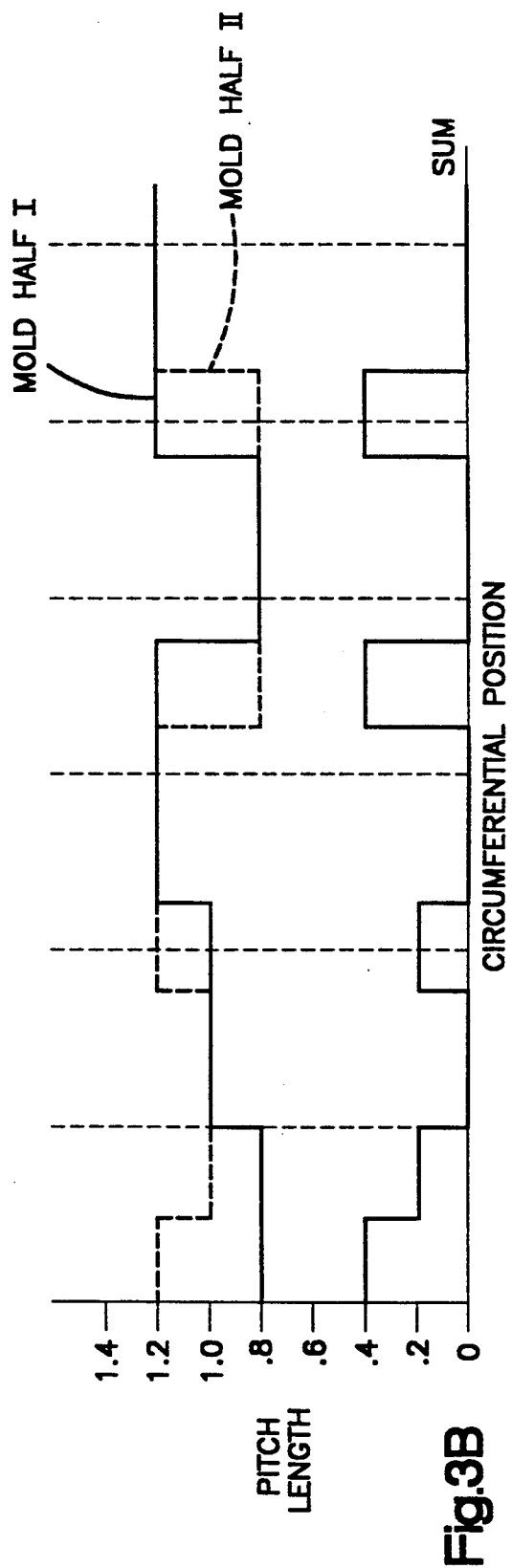

MULTIPLE PITCH SEQUENCE OPTIMIZATION

TECHNICAL FIELD

The present invention relates generally to tire treads, and more particularly to a method for reducing the noise produced by tire treads on a road surface by selectively arranging the pitch sequence in one circumferential section of the tire tread relative to the pitch sequence in at least one other circumferential section.

BACKGROUND OF THE INVENTION

A tire for a vehicle typically includes a tire carcass, breaker belt and tire tread. For example, the tire carcass for a radial tire includes radial plies extending from bead to bead and embedded in rubber. The radial plies generally include at least two layers, wherein each layer has a series of reinforcing cords which extend substantially perpendicular to the circumferential direction of the tire. Further, the belt plies for the radial tire are positioned between the carcass and the tire tread, and also generally include at least two layers having reinforcing cords.

The tire tread extends around the outer circumference of the tire and is designed to contact the road surface. The tire tread has a pattern which is segmented into a plurality of raised, load-supporting blocks separated by intersecting circumferential and transverse grooves and/or sipes. The blocks determine the control, acceleration and braking characteristics of the tire, while the grooves and/or sipes are necessary to provide flexibility and water removal.

The tread blocks for the tire are typically arranged in "base pitches", wherein each base pitch includes a predetermined geometry of whole and/or partial tread blocks. Each base pitch may vary in width across the tire. For example, each base pitch can extend transversely from the shoulder to the center line of the tire on each circumferential section or "mold half" of the tire. Alternatively, each base pitch can extend transversely over only a single circumferential section of the tire, for example over a single rib or combination of ribs. In any case, the base pitches are repeated around the circumference of the tire to form the complete tire tread.

The constant contact of the tire tread on the road surface can in some instances produce unwanted noise. In particular, as the tire contacts the road surface, the individual tread blocks cause air disturbances upon impact with the road, creating a spectrum of audio frequencies broadly referred to as "tire noise". Tire noise is generated at least in part by: (1) the impact of the tread block on the road surface; (2) the vibration of the tire carcass; and (3) the "air pumping" which occurs as the tread blocks become compressed and expand into the grooves separating adjacent blocks. The fundamental frequency of the noise is a function of the number of tread blocks around the circumference of the tire and the rotational speed of the tire.

Techniques have been developed to distribute the noise frequency produced by the tire tread over a wide frequency band to approach what is termed "white noise". For example, one known technique for reducing tread noise is to use base pitches having different pitch lengths, wherein the "pitch length" is a measure of the length from the leading edge of one base pitch to the leading edge of the next adjacent representative base pitch in the circumferential direction of the tire. A plurality of base pitches having different pitch lengths is conventionally referred to as a "pitch sequence". Other techniques use only random or sinusoidal sequencing of the pitches in an attempt to modulate the objectionable noise producing frequencies.

For example, Vorih, U.S. Pat. No. 3,926,238, discloses a technique for modulating noise produced by rotating load carrying elements by providing discrete pitch lengths in which the ratio of pitch lengths falls within the open intervals defined by the boundary nodal points $(N-1)/N:1.0$, (N being an integer selected from 2, 3, 4, 5 or 6), and excluding the ratios defined by the boundary nodal points. Further modulation is obtained by sequencing the individual pitches in such a manner that the sequence is characterized by a plurality of strings of the load carrying elements, each string consisting of at least three consecutive load carrying elements of substantially identical pitch length. The length and sequential positioning of the strings are selected to modulate the block frequency harmonic which is produced upon rotation of the tire.

The above techniques, however, are primarily designed to reduce noise in tires by varying the pitch length of the tread blocks around the circumference of the tire to spread the noise over a broad frequency band. The techniques are not directed toward reducing tire noise by selectively arranging the pitch sequence in one circumferential section of the tire relative to the pitch sequence in at least one other circumferential section.

One technique for reducing tire noise in tires by selectively arranging groups of pitch sequences in circumferential sections is shown in Lippmann et al, U.S. Pat. No. 2,878,852. Lippmann discloses a tire tread having male and female mold halves, wherein each mold half has a pitch sequence comprising individual "design units" i.e., a preselected number of tread blocks, extending around the circumference of the tire. The circumferential length of the repeating design units of the tread pattern are selected to be mirror images of themselves or of other groups of design units in each respective mold half. The pitch sequence in the male mold half, however, is identical to the pitch sequence in the female mold half. Accordingly, the Lippmann technique is not directed toward situations where the pitch sequence in one circumferential section (or mold half) is different then the pitch sequence in another circumferential section (or mold half). Moreover, the Lippmann technique does not selectively arrange the pitch sequence in each mold half relative to each other to reduce tire noise.

Accordingly, although the above-identified references disclose certain techniques for reducing tire noise, there is a constant demand in the industry for improved techniques which further reduce the tire noise, and in particular, for techniques which reduce the tire noise in tires having pitch sequences arranged in at least two circumferential sections, regardless of the pitch sequences employed.

SUMMARY OF THE INVENTION

The present invention provides a new and useful method for reducing tire noise in tire treads, and in particular for reducing the tire noise in tire treads having pitch sequences arranged in at least two circumferential sections by selectively arranging the pitch sequences in one circumferential section relative to the pitch sequences in at least one other circumferential section.

According to one form of the present invention, the tire tread includes a plurality of base pitches arranged in two circumferential sections or mold halves around the circumference of the tire. Each base pitch includes a pre-selected arrangement of load-supporting tread blocks separated by circumferential and transverse grooves and/or sipes. The base pitches have at least two different pitch lengths. The pitch lengths form a pitch sequence in each circumferential section around the tire.

The tire noise from the tire tread is reduced by arranging the pitch sequence in one circumferential section relative to the pitch sequence in the other circumferential section according to the following technique:

$$Ydiff = \sum_{x=0}^{Circ.} ABS[YA - YB]$$

Where:
- x = Distance around tire circumference stepped in preselected increments
- Circ. = Tire circumference
- ABS = Absolute Value
- YA = Pitch length for pitch sequence A at a given x value
- YB = Pitch length for pitch sequence B at a given x value
- Ydiff = Total difference between height of individual pitch sequence rectangle functions Where: Higher Ydiff indicates better match The match between the treatments is incremented by a value and the maximum Ydiff is stored, along with the match point it occurred at.

| Example: | Treatment A: | 12313 | Treatment B: | 32311 |
|---|---|---|---|---|
| | Pitch Lengths | 1 = .8 | Pitch Lengths: | 1 = .8 |
| | | 2 = 1.0 | | 2 = 1.0 |
| | | 3 = 1.2 | | 3 = 1.2 |

Where:
- x increment will be 0.2"
- Match point will be 3.4"

The particular relative arrangement of the pitch sequences is thus chosen for the tire tread which results in the greatest Ydiff value. As such, the rectangle functin of the pitch sequences in one circumferential section is substantially the inverse of the rectangle function of the pitch sequence in the other circumferential section.

Accordingly, selectively arranging the pitch sequences according to the above technique provides a tire tread having reduces tire noise.

According to an additional form of the invention, the above technique can also be used with tire treads having a plurality of base pitches arranged in three or more circumferential sections about the circumference of the tire. In this case, the pitch sequences in at least two of the circumferential sections which have the largest length of summation are arranged relative to each other using the above technique to provide a tire tread having reduced tire noise.

Accordingly, it is the basic object of this invention to provide a technique for reducing tire noise.

It is another object of this invention to provide a tire tread having two circumferential sections or mold halves wherein the base pitches on the tread are arranged such that the rectangle function of the pitch sequences in one circumferential section is substantially the inverse of the rectangle function of the pitch sequence in the other circumferential section, regardless of the pitch sequences employed on each circumferential section.

It is still another object of the present invention to provide a tire tread having three or more circumferential sections, wherein the pitch sequences are selectively arranged relative to each other in at least two of the circumferential sections to reduce the noise of the tire on the road surface.

Further objects and advantages of the present invention will become further apparent from the following detailed description and the accompanying drawings.

BRIEF DESCRIPTION OF THE DRAWINGS

FIGS. 3A and 3B are schematic illustrations of rectangle functions showing the proper and improper noise treatment for a tire tread.

DETAILED DESCRIPTION OF THE PREFERRED EMBODIMENT

Figure 1:
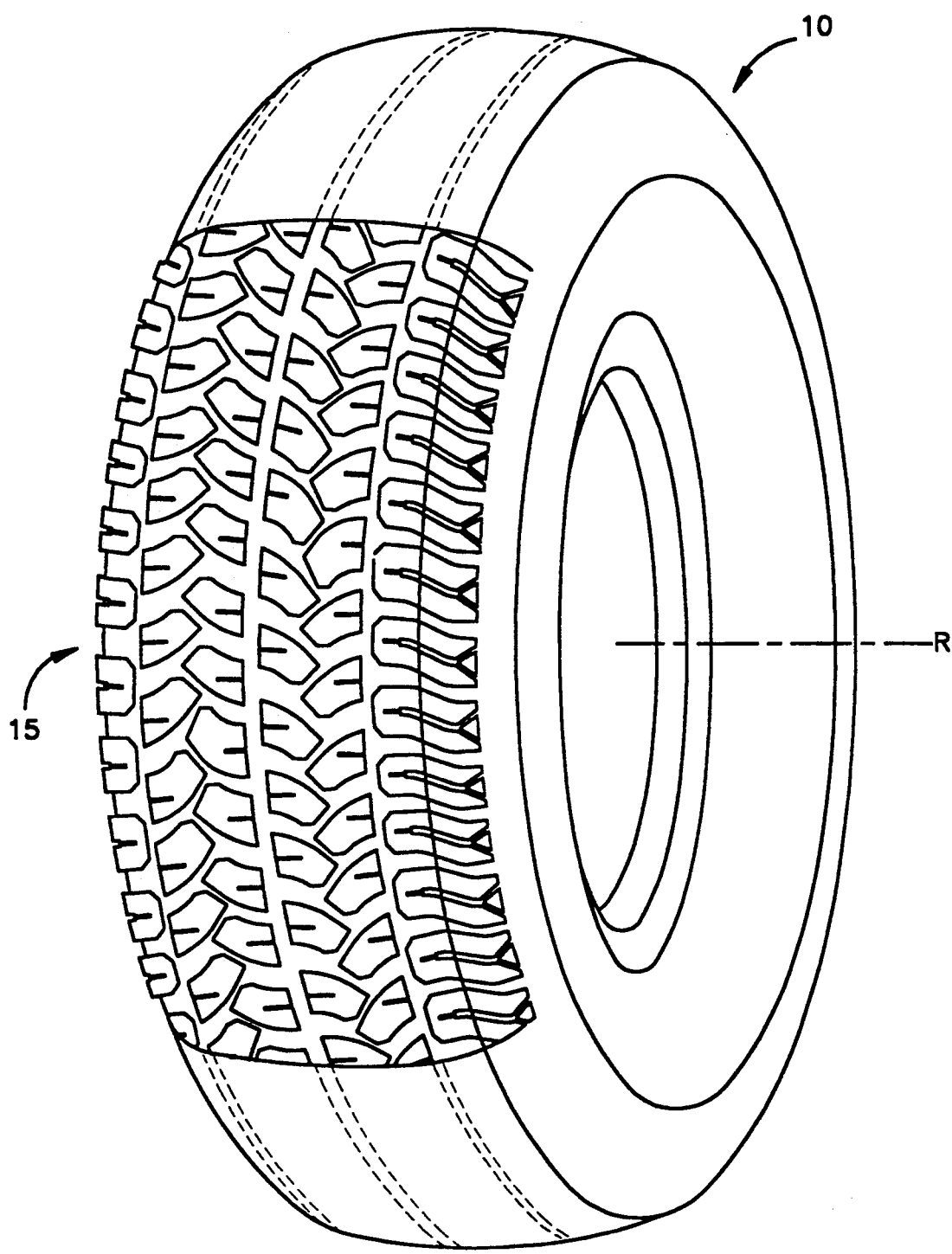
FIG. 1 is a perspective view of a tire having a tread made in accordance with the present invention.

Referring to the drawings, and initially to FIG. 1, a tire, indicated generally at 10, preferably includes a tire tread, indicated generally at 15, extending circumferentially around the tire. The tire is adapted to rotate around an axis R. According to the preferred form of the invention, the tire is preferably a radial tire, however the present invention is not limited to any particular tire type; rather the invention is appropriate for any type of tire having a tread. In any case, the techniques for manufacturing and forming the tire are known to those skilled in the tire art and will not be discussed further.

Figure 2:
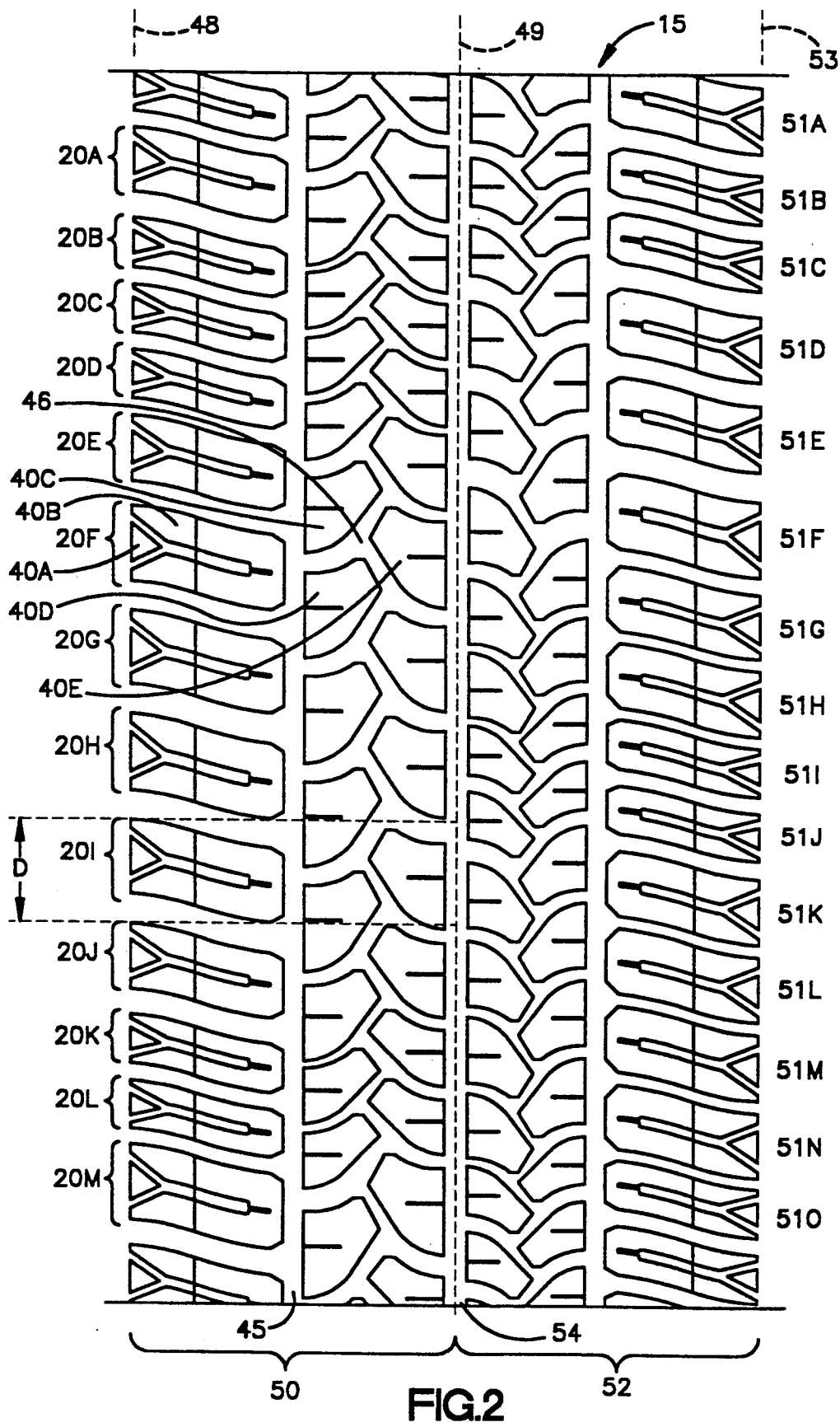
FIG. 2 is a schematic partial plan view of a block pattern of a tire tread made in accordance with the present invention.

As shown in FIG. 2, the tread 15 of the tire includes a plurality of base pitches, for example base pitches 20A-20M. Each base pitch preferably includes a predetermined geometry of whole and partial load-supporting tread blocks. For example, base pitch 20F includes tread blocks 40A and 40B, and at least partially includes tread blocks 40C-40E. The tread blocks are separated by circumferential and transverse grooves and/or sipes. For example, blocks 40B and 40D are separated by a circumferential groove 45, while blocks 40C and 40D are separated by a transverse groove 46. The transverse grooves can have a depth which typically varies across the width of the tire.

The width of the base pitches 20A-20M may also vary across the tire. The base pitches preferably extend transversely from the shoulder 48 to the center line 49 of the tire tread, however, as indicated previously, each base pitch could also extend transversely across only a portion of the tire, for example across a single circumferential section (or rib) of the tire. In any case, each base pitch 20A-20M has a characteristic length "D" (see e.g., base pitch 20i) extending in the circumferential direction of the tire, as will be described herein in more detail.

The base pitches are repeated about the circumference of the tire to form the tire tread. The tread protects the carcass and belt layers while providing traction for the tire on the road surface. The techniques for forming the base pitches on the tire tread are known to those skilled in the tire art using conventional tire forming techniques, and will not be discussed further.

According to the present invention, the base pitches on the tire tread are preferably arranged on two circumferential sections or "mold halves". For example, the base pitches 20A-20I can be arranged on a first mold half, indicated generally at 50, extending from one shoulder 48 to the centerline 49, while additional base pitches, 51A-51O can be arranged on a second mold half, indicated generally at 52, extending from the other shoulder 53 to the centerline 49. The mold halves extend circumferentially around the tire and can be separated from one another by a circumferential groove or a solid center rib. For example, the first mold half 50 can be separated from the second mold half 52 by a circumferential groove 54.

The number of base pitches located around the circumference of the tire in each mold half determines the pitch of the tire. For example, an "88" pitch tire typically has 88 base pitches in each mold half spaced around the circumference of the tire. Other pitches can also be used, e.g., 61, 64, 67, etc., as will be known to those skilled in the art.

The length "D" of the bas pitches in the circumferential direction of the tire in each mold half is typically varied to at least partially reduce the noise of the tire on the road (i.e., to spread the harmonics over a wide frequency range) and to prevent cyclical harmonics from forming as the tire rotates. The length of the base pitches can be varied using any known technique, including, for example, random or sinusoidal sequencing. For example, it is known to use sequences of base pitches having up to eight different pitch lengths; however, it is more common to use only two or three different pitch lengths in pitch sequences around the circumference of the tire.

A particularly useful pitch sequence for a tire tread having e.g., three pitch lengths (i.e., 1, 2, 3) is represented by the relative circumferential distances: 3112333321113122113332123311123121112311322332-3113213122213331123 (hereinafter "Pitch Sequence II"). It will be understood by those skilled in the art that the above numbers represent the relative circumferential length of successive base pitches expressed in any desired measuring unit, such as tenths of an inch, millimeters, etc., and that the pitches are repeated as many times as necessary to completely encircle the tire tread.

For example, he following ratios of pitch lengths can be used for Pitch Sequence I and labeled as follows: 1.000-1.298-1.623 for the above blocks numbered 1, 2, 3, respectively; while the following ratios of pitch lengths can be used for Pitch Sequence II and labeled as follows: 1:000-1.250-1.500 for the blocks numbered 1, 2, 3, respectively.

In any case, the pitch sequences such as those described above can be placed in each mold half around the circumference of the tire. For example, Pitch Sequence I can be placed on the first mold half 50 to completely encircle the tire, while Pitch Sequence II can be placed on the second mold half 52, or vice-versa. However, it is also within the scope of this invention to place the same pitch sequence on both mold halves of the tire.

According to the preferred form of the invention, the pitch sequences in each mold half are arranged relative to each other in accordance with the following technique:

$$Ydiff = \sum_{x=0}^{Circ.} ABS[YA - YB]$$

Where:
x = Distance around tire circumference stepped in preselected increments, such as 0.0005"
Circ. = Tire circumference
ABS = Absolute Value
YA = Pitch length for pitch sequence A at a given x value
YB = Pitch length for pitch sequence B at a given x value
Ydiff = Total difference between height of individual pitch sequence rectangle functions
Where: Higher Ydiff indicates better match The match between the treatments is incremented by a value, such as 0.3", and the maximum Ydiff is stored, along with the match point it occurred at.

| Example: | Treatment A: | 12313 | Treatment B: | 32311 |
|---|---|---|---|---|
| | Pitch Lengths | 1 = .8 | Pitch Lengths: | 1 = .8 |
| | | 2 = 1.0 | | 2 = 1.0 |
| | | 3 = 1.2 | | 3 = 1.2 |

Where:
x increment will be 0.2"
Match point will be 3.4"

The program inputs for the technique include: (1) the tire circumference; (2) the number of pitch sequences to match; (3) the matching increment (rotational step between treatments); (4) the number of units (the number of different pitch sizes); (5) the number of pitches (total number of pitches used); (6) the unit ratios; and (7) the pitch sequence. The algorithm provides as outputs: (1) the match number for treatments; (2) the total length of best match rectangle function; (3) the rotation for best match; (4) the total length of worst match rectangle function; and (5) the rotation for worst match.

FIGS. 3A and 3B schematically illustrate the rectangle function of a proper noise treatment for a tire using the above technique (FIG. 3A), and the rectangle function for an improper noise treatment for a tire (FIG. 3B). The "rectangle function" is a representation of the variation of pitch length for each mold half around the circumference of the tire. The figures illustrate a first pitch sequence (i.e. 12313) in mold half I matched against a second pitch sequence (i.e., 32311) in mold half II. The length "L" of the rectangle function denotes the particular pitch length (e.g., 1, 2, 3); while the height "H" of the rectangle function denotes the difference between pitch lengths (e.g., 0.200, 0.400, etc.).

According to the present invention, the pitch sequences on a tire tread having two circumferential sections or mold halves are arranged relative to each other to reduce the tire noise. In particular, as illustrated by the rectangle function in FIG. 3A, the pitch sequences are arranged using the above-technique described such that the rectangle function of the pitch sequence in the first mold half is substantially the inverse of the rectangle function of the pitch sequence in the second mold half, regardless of the particular pitch sequences employed.

The combination (i.e., ABS[YA-YB]) of the rectangle functions is illustrated as "SUM", and it can be seen by comparing FIGS. 3A and 3B, that the combination of the rectangle functions for the proper noise treatment (FIG. 3A) is less than the combination for the improper noise treatment (FIG. 3B). An analogy can aptly be drawn to acoustics, where each rectangle function can be represented as a sine wave, and wherein the sine waves are arranged 180° out of phase with each other such that each wave substantially cancels the other. In more structural terms, the small base pitches in the pitch sequence in one mold half of the tire are arranged opposite the large base pitches in the pitch sequence in the other mold half of the tire. Accordingly, the noise produces by the base pitches in the tire tread is reduces to a low level, distributed noise.

Moreover, it will be apparent to one of ordinary skill in the art that the above-described technique can be used with tire treads having different pitch sequences than those illustrated above, as well as tire treads having more than two circumferential sections of pitch sequences. In the latter case, the more dominant pitch sequences, i.e., the pitch sequences having the larger Ydiff are typically arranged according to the above technique.

For example, to determine the more dominant pitch sequences for a tire tread having three circumferential sections of pitch sequences e.g., pitch sequence a, b and c, the above technique is performed on the pitch sequence pairs a:b, b:c and a:c. The pairs with the largest length of summation are chosen to provide the best match and are arranged relative to each other according to the above technique to provide a tire tread with reduced tire noise. As indicated previously, other combinations of pitch sequences can be anticipated which can be arranged according to the above technique, as should be apparent to those skilled in the art.

Accordingly, the present invention provides a technique for reducing tire noise which can be used on wide variety of commercially-available tires. Moreover, the invention provides a technique which reduces tire noise for tires having pitch sequences arranged on two circumferential sections or mold halves, as well as tires having pitch sequences arranged on more than three circumferential sections. However, with the present disclosure in mind, it is believed that obvious alternatives will become apparent to those of ordinary skill in the art.

What is claimed is:

1. A tire having a tread with a plurality of base pitches arranged in at least two separate circumferential sections around the circumference of the tire, the base pitches in each circumferential section having at least two different pitch lengths which form preselected pitch sequences about the circumference of the tire, the pitch sequence in each of the circumferential sections being arranged relative to each other according to the following technique:

$$Ydiff = \sum_{x=0}^{Circ.} ABS[YA - YB]$$

Where:
- x = Distance around tire circumference stepped in preselected increments
- Circ. = Tire circumference
- ABS = Absolute Value
- YA = Pitch length in a pitch sequence A of a first circumferential section at a given x value
- YB = Pitch length in a pitch sequence B of a second circumferential section at a given x value
- Ydiff = Total difference between height of individual pitch sequence rectangle functions Where a higher Ydiff indicates better match, and the relative arrangement of the pitch sequences in the circumferential sections have the greatest Ydiff value compared to all other incremental stepped arrangements of pitch sequences for the tire tread.

2. A tire as in claim 2, wherein each of said pitch sequences has at least three different pitch lengths which form said preselected pitch sequences about the circumference of the tire.

3. A tire as in claim 2, wherein each of said base pitches includes at least one load supporting tread block.

4. A tire as in claim 3, wherein each of said base pitches includes a plurality of load supporting tread blocks, said load supporting tread blocks being separated by circumferential grooves and transverse grooves and/or sipes.

5. A tire as in claim 4, wherein at least one of said pitch sequences is: 3112333321113122113332123311123121112311322333 2-3113213122221333123.

6. A tire as in claim 5, wherein said three different pitch lengths of said pitch sequence are in the ratio of approximately 1.000-1.298-1.623.

7. A tire as in claim 4, wherein at least one of said pitch sequences is: 112313112233211321131123212 3131332332333113323311131332331132131331112121 2-2.

8. A tire as in claim 7, wherein said three different pitch lengths of said pitch sequences are in the ratio of approximately 1.000-1.250-1.500.

9. A tire as in claim 4, wherein said base pitches are arranged in three separate circumferential sections around the circumference of the tire, the base pitches in each of said three circumferential sections having at least two different pitch lengths which form said preselected pitch sequences about the circumference of the tire.

10. A tire as in claim 9, wherein each of said pitch sequences has at least three different pitch lengths which form said preselected pitch sequences about the circumference of the tire.

11. A tire as in claim 10, wherein at least one of said pitch sequences is: 3112333321113122113332123311123121112311322333 2-3113213 12221333123.

12. A tire as in claim 11 wherein said three different pitch lengths of said pitch sequences are in the ratio of approximately 1.000-1.298-1.623.

13. A tire as in claim 10, wherein at least one of said pitch sequences is: 1123131122332113211311232123131332332333113323 3-1113133233113213133111212122.

14. A tire as in claim 13 wherein said three different pitch length of said pitch sequences are in the ratio of approximately 1.000-1.250-1.500.

15. A tire as in claim 10, wherein the preselected pitch sequence in one circumferential section is different than the preselected pitch sequence in at least one other circumferential section.

* * * * *

UNITED STATES PATENT AND TRADEMARK OFFICE
CERTIFICATE OF CORRECTION

PATENT NO. : 5,309,965
DATED : May 10, 1994
INVENTOR(S) : Thomas A. Williams

It is certified that error appears in the above-indentified patent and that said Letters Patent is hereby corrected as shown below:

Column 8, line 10, delete "2" and insert —1—.

Signed and Sealed this

Sixth Day of September, 1994

*Attest:*

BRUCE LEHMAN

*Attesting Officer*  Commissioner of Patents and Trademarks